United States Patent
Van

(10) Patent No.: US 9,258,308 B1
(45) Date of Patent: *Feb. 9, 2016

(54) POINT TO MULTI-POINT CONNECTIONS

(71) Applicant: Xceedium, Inc., Herndon, VA (US)

(72) Inventor: David Van, Somerset, NJ (US)

(73) Assignee: Xceedium, Inc., Herndon, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/451,370

(22) Filed: Aug. 4, 2014

Related U.S. Application Data

(63) Continuation of application No. 11/786,969, filed on Apr. 13, 2007, now Pat. No. 8,831,011.

(60) Provisional application No. 60/792,160, filed on Apr. 13, 2006, provisional application No. 60/857,659, filed on Nov. 7, 2006.

(51) Int. Cl.
*H04L 29/06* (2006.01)
*H04L 29/08* (2006.01)

(52) U.S. Cl.
CPC .............. *H04L 63/10* (2013.01); *H04L 67/141* (2013.01)

(58) Field of Classification Search
None
See application file for complete search history.

(56) References Cited

U.S. PATENT DOCUMENTS

| | | | |
|---|---|---|---|
| 6,308,163 B1 | 10/2001 | Du et al. | |
| 6,353,886 B1 | 3/2002 | Howard et al. | |
| 6,490,289 B1 * | 12/2002 | Zhang et al. | 370/401 |
| 7,047,560 B2 | 5/2006 | Fishman et al. | |
| 7,139,811 B2 * | 11/2006 | Lev Ran et al. | 709/217 |
| 7,194,764 B2 | 3/2007 | Martherus et al. | |
| 7,849,203 B2 | 12/2010 | Berkey et al. | |
| 2002/0075844 A1 | 6/2002 | Hagen | |
| 2002/0116642 A1 | 8/2002 | Joshi et al. | |
| 2003/0074407 A1 * | 4/2003 | Zhang et al. | 709/205 |
| 2004/0042454 A1 | 3/2004 | Zabihi et al. | |
| 2004/0111520 A1 | 6/2004 | Krantz et al. | |
| 2005/0114609 A1 | 5/2005 | Shorb | |
| 2005/0138362 A1 * | 6/2005 | Kelly et al. | 713/156 |
| 2005/0251808 A1 * | 11/2005 | Gbadegesin et al. | 719/310 |
| 2006/0014532 A1 | 1/2006 | Seligmann et al. | |
| 2006/0026670 A1 | 2/2006 | Potter et al. | |
| 2006/0095276 A1 | 5/2006 | Axelrod et al. | |
| 2007/0054840 A1 | 3/2007 | Vrijbloed et al. | |
| 2007/0074162 A1 | 3/2007 | Meijer et al. | |
| 2007/0289006 A1 | 12/2007 | Ramachandran et al. | |
| 2008/0040773 A1 | 2/2008 | Albadarin et al. | |
| 2008/0109897 A1 | 5/2008 | Moran et al. | |

* cited by examiner

*Primary Examiner* — Hicham Foud
(74) *Attorney, Agent, or Firm* — Baker Botts L.L.P.

(57) ABSTRACT

Communicating with a plurality of networks is disclosed. One or more credentials is provided to a first gatekeeper of a first network. One or more credentials is provided to a second gatekeeper of a second network. A session is maintained with the first gatekeeper. A second session is simultaneously maintained with the second gatekeeper.

20 Claims, 15 Drawing Sheets

POINT TO MULTI-POINT CONNECTIONS

CROSS REFERENCE TO OTHER APPLICATIONS

This application is a continuation of co-pending U.S. patent application Ser. No. 11/786,969, entitled POINT TO MULTI-POINT CONNECTIONS filed Apr. 13, 2007 which is incorporated herein by reference for all purposes, which claims priority to U.S. Provisional Patent Application No. 60/792,160 entitled MULTI-NETWORK CONNECTIVITY filed Apr. 13, 2006 which is incorporated herein by reference for all purposes and also claims priority to U.S. Provisional Patent Application No. 60/857,659 entitled AUTOMATIC INTERVENTION filed Nov. 7, 2006 which is incorporated herein by reference for all purposes.

BACKGROUND OF THE INVENTION

Typical secure remote access technologies, such as IPSEC and SSL VPNs allow remote end-users to access applications and files residing in a single network behind an access gateway. Unfortunately, IT administrators often need access to different resources from distributed networks to perform their tasks.

For example, a managed service provider might maintain the Tokyo, Chicago, and London (geographically dispersed) networks of an international bank. A particular administrator working for the managed service provider may be responsible for maintaining all of the servers of a particular type across all three networks and may routinely be required to perform upgrades across those three networks at the same time.

Suppose the administrator needs to apply a patch currently located on a system in Tokyo to systems in Chicago and London. One technique is to use an IPSEC VPN gateway to bridge the three networks and create routable paths between them such that the administrator can authenticate to a single access gateway and "see" the other networks behind it. Unfortunately, by doing so a security risk is also created—the bridging of multiple networks to allow an individual to see all three networks effectively gives that user full access across the WAN. If the individual is untrustworthy, inept, or the individual's client is otherwise compromised, all three networks can now be compromised. Further, networks are increasingly intentionally segregated for reasons such as government regulations/auditing, etc. In such cases bridging multiple disjoint networks may not be possible.

Another option is for the administrator to make use of serial connections. In that scenario, the administrator would first connect to Tokyo and copy the file locally to his laptop. The administrator would then disconnect from Tokyo and connect to London, copying the file from his laptop to a node in London. After performing the updates, the administrator would disconnect from London and connect to Chicago. The administrator would again copy the file from his laptop to a node in Chicago, perform the necessary administrative tasks, and disconnect. While the Tokyo, London, and Chicago networks can remain disjoint in this scenario, the administrator is likely to spend a lot of additional overhead (e.g., in time) logging in and out of networks, copying information to and from his laptop, etc.

Therefore, it would be desirable to have a better way to connect to multiple networks.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
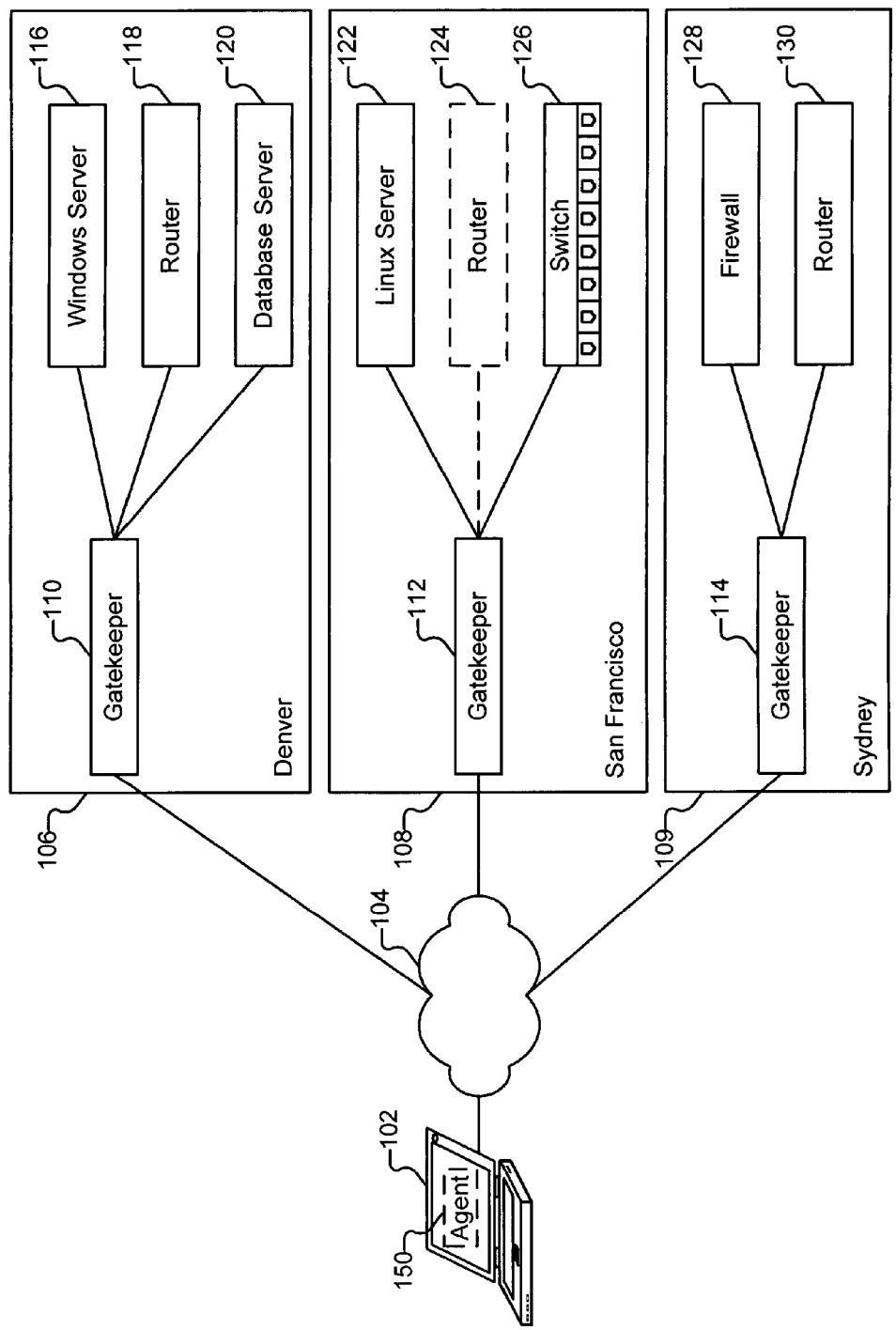
FIG. 1 is a block diagram illustrating an embodiment of an environment in which point to multi-point connections are made.

FIG. 1 is a block diagram illustrating an embodiment of an environment in which point to multi-point connections are made. In the example shown, client 102 is used to administer various nodes (also referred to herein as "devices") in three networks. Examples of users of client 102 include in-house engineers/administrators, consultants, vendors, and managed service providers (hereinafter referred to collectively as "administrators"). In some cases, administrators administer entire nodes (such as a file server). In other cases, administers administer subsets of nodes such as by administering particular services without administering other services on the same node. As used herein, the "resources" administered by an administrator refer to the nodes and/or services an administrator is authorized to access. Some of the resources administered may be critical pieces of infrastructure, such as production servers or databases.

Network 106 is an enterprise network located in Denver that includes (among other nodes) a Windows server 116, a router 118, and a database server 120. Network 108 is an enterprise network located in San Francisco that includes (among other nodes) a Linux server 122, a router 124, and a switch 126. Network 109 is an enterprise network located in Sydney that includes (among other nodes) a firewall 128 and a router 130. In the example shown, networks 106-109 are disjoint, meaning that they do not share a direct connection (e.g., from network 106 to network 108) but instead are connected via the Internet 104. In some embodiments the networks may be in close physical proximity but otherwise disjoint, such as in an environment where blade computers and virtualization software are used.

In the example shown, a particular administrator (also referred to herein as "Alice") has the responsibility of administering resources on nodes 116-122 and 126-130 using her company issued laptop, client 102. Alice does not administer node 124. Other examples of clients include workstations, personal computers, and cellular phones/personal digital assistants (PDAs), as well as other types of information appliances, as applicable. In some embodiments, an agent 150 facilitates communication between client 102 and networks 106-109.

Suppose Alice is physically located in Albuquerque. As described in more detail below, she uses client 102 to maintain concurrent sessions with gatekeepers 110, 112, and 114. After authenticating Alice, the gatekeepers provide client 102 with instructions that map ports on Alice's laptop with services on the devices she is authorized to administer. Alice is presented an abstracted consolidated view of those resources on networks 106-109 to which she is authorized access, and cannot view the resources on those networks that she is not authorized to access. Networks 106-109 may each contain hundreds or thousands of nodes. Nonetheless, using the techniques described herein, only the subset of resources Alice is authorized to access will be visible to her. For example, after authenticating to gatekeepers 110-114 and initiating sessions with those gatekeepers, Alice will be able to copy files from Windows server 116 to Linux server 122 by using native tools on her laptop such as the file explorer and/or an scp client, while simultaneously viewing the configuration of firewall 128. Alice will not be able to see router 124 (represented here using dashed lines).

Figure 2:
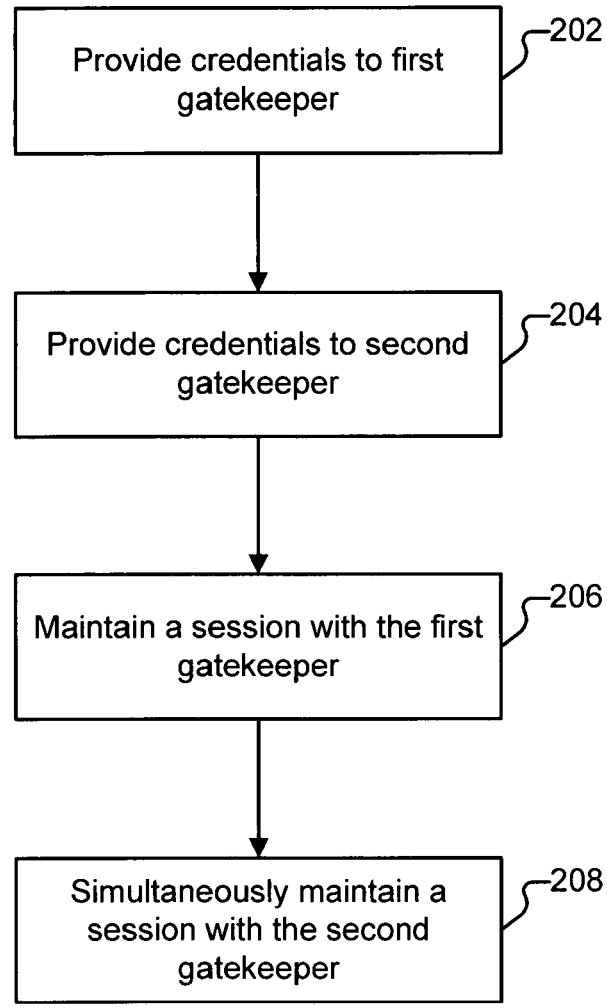
FIG. 2 is a flow chart illustrating an embodiment of a process for communicating with a plurality of networks.

FIG. 2 is a flow chart illustrating an embodiment of a process for communicating with a plurality of networks. In some embodiments the process shown in FIG. 2 is performed by client 102. As described in more detail below, in some embodiments agent 150 facilitates the process shown in FIG. 2. The process begins at 202 when one or more credentials are provided to a first gatekeeper. For example, at 202 client 102 provides credentials to gatekeeper 110. In some embodiments, Alice provides credentials at 202 by starting agent 150 on her laptop, and providing agent 150 with the IP address of gatekeeper 110, and a username and password by which gatekeeper 110 can authenticate her. In various embodiments other authentication techniques are used instead of or in addition to providing a name and a password, such as by requiring Alice to provide a secondary authentication factor or a digital certificate.

At 204, one or more credentials are provided to a second gatekeeper. For example, at 204, client 102 provides credentials to gatekeeper 112. In some embodiments Alice is prompted to provide the addresses of all the gatekeepers she authorized to communicate with along with the credentials needed to authenticate to those gatekeepers. For example, when Alice first uses client 102 to communicate with networks 106-109, as part of a setup phase, she might be requested to provide the IP addresses of gatekeepers 110-114 and any logins/passwords associated with those gatekeepers.

In some embodiments, the gatekeepers maintain lists of other gatekeepers and the authorized users of those gatekeepers. When Alice attempts to log in to a first gatekeeper, that gatekeeper may be configured to automatically provide Alice's credentials to the other gatekeepers in lieu of Alice providing it to each gatekeeper herself.

At 206, a session is maintained with the first gatekeeper. For example, after validating Alice's credentials, gatekeeper 110 determines the resources to which Alice should be granted access and provides client 102 with instructions for reaching those resources. As described in more detail below, gatekeeper 110 facilitates communication between Alice and the resources during the session with gatekeeper 110.

At 208, a session is maintained with a second gatekeeper while simultaneously maintaining a session with the first gatekeeper. For example, at 208, Alice has two concurrent sessions with two gatekeepers—gatekeeper 110 and gatekeeper 112. As applicable, Alice can maintain more than two sessions. For example, if Alice authenticates to gatekeeper 114, Alice can establish three concurrent sessions, one each with gatekeepers 110-114, and is able to simultaneously see resources 116-122 and 126-130.

Figure 3:
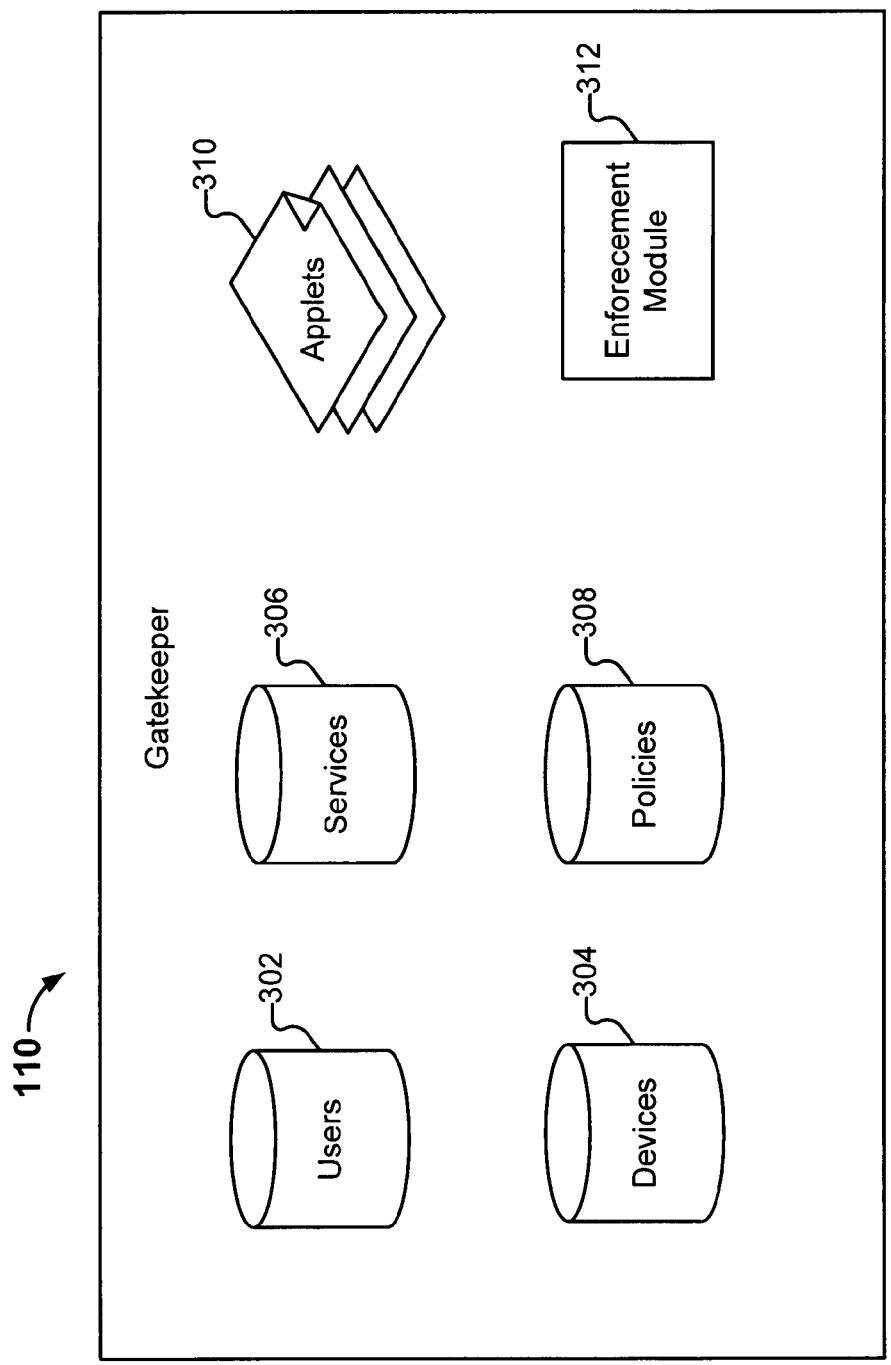
FIG. 3 is a block diagram illustrating an embodiment of a gatekeeper.

FIG. 3 is a block diagram illustrating an embodiment of a gatekeeper. In the example shown, gatekeeper 110 includes a user database 302. User database 302 includes a list of users authorized to access gatekeeper 110 and those users' credentials. For example, user database 302 might include Alice's username (e.g., alice.jones) and information suitable to authenticate Alice (e.g., a hash of her passphrase, a digital certificate, etc.).

Device database 304 includes a list of all of the devices on a network that can be made available to administrators via a gatekeeper. For example, Windows server 116, router 118, and database server 120 could be included in gatekeeper 110's device database, along with information such as those nodes IP addresses and, if applicable, network name.

Service database 306 includes a list of services provided by the devices in device database 304. Examples of services include FTP and SSH. In some embodiments the services listed in service database 306 include all services listening on the ports of the devices listed in device database 304.

Policy database 308 includes four dimensional policies that govern the resources that client 102 is allowed to access. The dimensions are user, time, service, and device. An example policy could be represented in policy database 306 as a row entry of the form (user,time,service,device). For example, suppose Alice is permitted to connect to Windows server 116 nightly so that she can perform integrity checks. User database 302 includes an entry for Alice. Device database 304 includes an entry for Windows server 116 and its IP address. Service database 306 includes entries KVM_web and RDP, the two connection methods that Windows server 302 supports. Suppose Alice is only permitted to connect using KVM_web. A policy defining her access rights might be represented in policy database 306 as (alice.jones,23:00, 23:59, RDP, WindowsServer116), where 23:00 indicates that she may start using the service at 23:00 and where 23:59 indicates that her authorization to use the service ends at 23:59.

In some embodiments Alice receives permission to access a bundle of services (e.g., FTP and SSH) across a bundle of devices (e.g., nodes 116, 120, and 122) during certain time periods, without being constrained to use, e.g., SSH on node 116 but not on node 120. Similarly, Alice may be permitted to perform any of those services on any of those devices during a time window (e.g., 8 am to noon) rather than specifying precise times that specific tasks may be performed. In various embodiments, policies may include fewer or more dimensions. For example, Alice may not be constrained by time in some actions, or the time constraints may be more flexible.

In various embodiments, other data structures are used to store and provide access to the information contained in databases 302-308 such as flat files. In the example shown, the contents of each database is thin. For example, while there may be many different versions of FTP offered across several different platforms (e.g., FTP for Windows, FTP for Linux, and the assorted versions thereof), there might be only a single "FTP" entry in the services database that is used to indicate any and all of those particular instances of FTP.

Enforcement module 312 provides agent 150 with instructions based on applicable policies stored in policy database 308. Gatekeeper 110 also includes a variety of applets 310 that can be provided to client 102 as needed.

Figure 4:
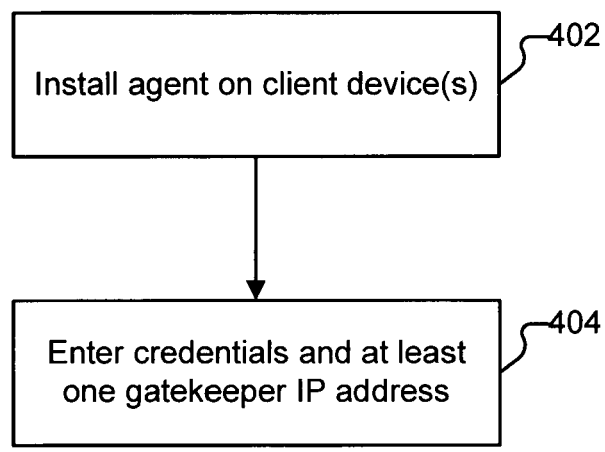
FIG. 4 is a flow chart illustrating an embodiment of a process for enrolling a user with a gatekeeper.

FIG. 4 is a flow chart illustrating an embodiment of a process for enrolling a user with a gatekeeper. In some embodiments the process shown in FIG. 4 is performed by client 102. The process begins at 402 when an agent such as agent 150 is installed on a client device such as client 102. Administrators often use multiple clients, such as workstations during regular business hours, laptops when at home, and PDAs or other portable devices when mobile. Accordingly, the process performed at 402 may be repeated for each of the clients the administrator intends to use to access resources on the networks the administrator administers. Similarly, the process performed at 402 may be repeated whenever Alice obtains a new laptop or otherwise upgrades client 102. In some embodiments the agent is a Java-based package and is cross-platform. In other embodiments, platform specific agents are used at 402.

At 404, user credentials are provided, along with the location of at least one gatekeeper. For example, at 404, Alice starts agent 150 and is prompted to enter the location of at least one gatekeeper and the credentials that she would like to use to authenticate to that gatekeeper. If Alice has access to multiple gateways, she may provide their information at 404 as well, or the gatekeepers may communicate Alice's information amongst themselves without her needing to enter more than one gatekeeper's information into agent 150. In some embodiments, the agent itself requires credentials to start, and Alice is prompted to provide those credentials at startup.

Figure 5:
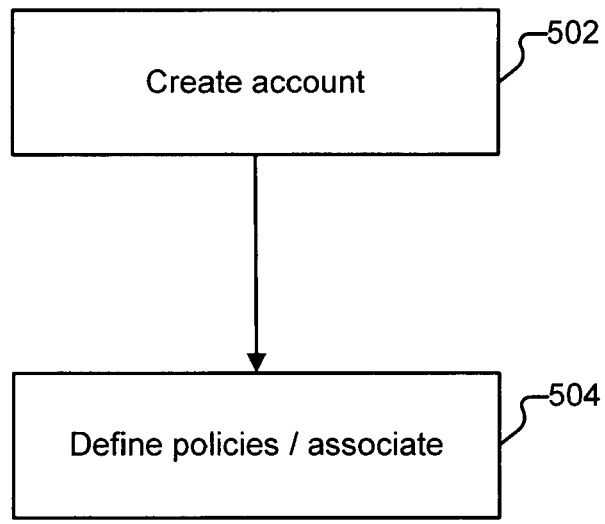
FIG. 5 is a flow chart illustrating an embodiment of a process for enrolling a user with a gatekeeper.

FIG. 5 is a flow chart illustrating an embodiment of a process for enrolling a user with a gatekeeper. In some embodiments the process shown in FIG. 5 is performed by gatekeeper 110. The process begins at 502 when an account for a user such as Alice is established. One way of establishing an account is to create an entry in the user database that specifies the user's credentials and whether the user is subject to time based restrictions or may always access authorized resources (an "always on" account). For example, suppose another user, Bob, is hired to assist Alice on a large project during an upcoming weekend. Bob's account can be created at any time, but an indicator can be associated with his account that his account should only be active between 17:00 on Friday through 21:00 on Sunday.

At 504, the created user account is mapped or associated with applicable policies, such as that the user may access FTP and SSH on Linux server 122. In some embodiments, the policies applicable to a particular user are based on the user's role. For example, all database administrators may be given the same access to the same resources. In such a case, templates or wizards may be used by the entity configuring the gatekeeper. If the user should be given access to resources on different networks, that access can be specified at 504 by a single entity and propagated to the corresponding gatekeepers of those networks, or the individual gatekeepers can each be manually configured. In some embodiments the credentials used by a user such as Alice may vary across gatekeepers. For example, Alice may connect to gatekeeper 110 using a name/password pair, and connect to gatekeeper 112 using a digital certificate. In such case, the user and policy databases maintained by those gateways may link Alice's accounts such as by associating each of her accounts with a unique identifier.

Figure 6:
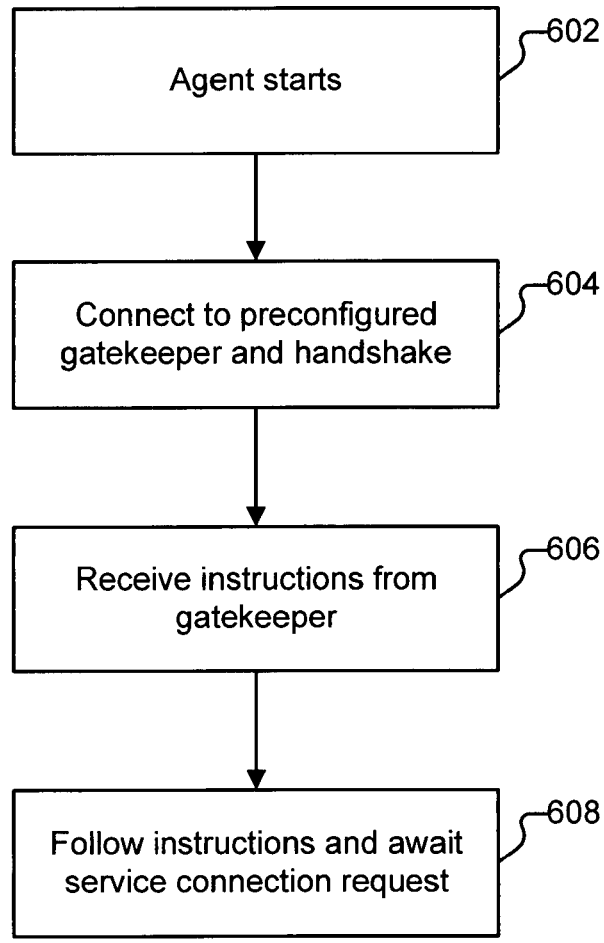
FIG. 6 is a flow chart illustrating an embodiment of a process for establishing a session with a gatekeeper.

FIG. 6 is a flow chart illustrating an embodiment of a process for establishing a session with a gatekeeper. In some embodiments the process is performed by client 102. The process begins at 602 when agent 150 is started. In some embodiments agent 150 is configured to load whenever client 102 is booted or whenever a user such as Alice logs into client 102. Agent 150 can also be configured to load only when Alice takes an action such as clicking on a program icon. In various embodiments, Alice is required to provide credentials to agent 150 before she is granted access to it.

At 604, the agent connects to the first preconfigured gatekeeper (e.g., specified at 404 in the process shown in FIG. 4) and performs a handshake.

At 606, the agent receives instructions that indicate how authorized resources can be accessed. As described in more detail below, the instructions might include information on port binding/forwarding.

At 608, the agent follows the instructions received at 606 and awaits service connection requests. For example, at 608 the agent might bind a service to localhost port 6000 and await the user's use of that port.

Figure 7:
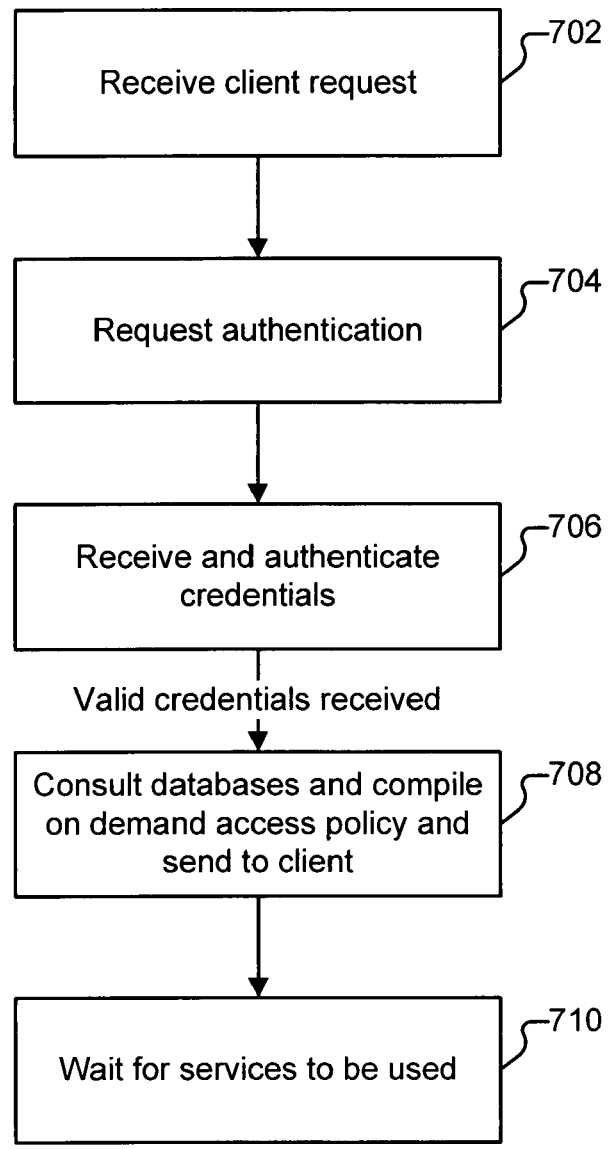
FIG. 7 is a flow chart illustrating an embodiment of a process for establishing a session with a client.

FIG. 7 is a flow chart illustrating an embodiment of a process for establishing a session with a client. In some embodiments the process shown in FIG. 7 is performed by gatekeeper 110. The process begins at 702 when a client connection request is received. For example, at 702 a connection request is received from client 102. At 704, authentication is requested from the client. At 706, the received credentials are validated.

At 708, an on-demand access policy is compiled and sent to the client. For example, at 708 each of the databases 302-308 is queried for entries pertaining to the user of the client and instructions are transmitted to the client that indicate how the client may access the resources enumerated in the compiled access policy.

Suppose, for example, that Alice is establishing a session with gatekeeper 112. On network 108, Alice is authorized to access Linux server 122 and switch 126 using the FTP, SSH, and telnet services, but is not authorized to access router 124 at all, and is not authorized to access any other services on nodes 122 or 126. Also suppose that Linux server 122 supports all three services, while router 124 only supports the telnet service. At 708, client 102 receives instructions to port forward 127.0.0.1 port 21 to Linux server 122's FTP service, forward 127.0.0.1 port 22 to Linux server 122's SSH service, forward 127.0.0.1 port 23 to Linux server 122's telnet service, and forward 127.0.0.2 port 123 to router 126's telnet service. Per the received instructions, agent 150 will bind to the local port, set up a listener, and the listener will port forward as appropriate.

In some embodiments, rather than forwarding directly to the service, agent 150 is instructed to forward localhost to a port on the gatekeeper, which in turn forwards to the appropriate resource. In such a case, a unique identifier is used by the gatekeeper to map the localhost and remote resource to one another. By using this technique, encryption can be used in the communications between client 102 and resources that might typically otherwise be sent in the clear, such as communications sent to an ODBC port. Additionally, the IP address of the resource need not be exposed to client 102. If client 102 is lost or stolen, a nefarious individual attempting to connect to remote resources will be thwarted accordingly.

Suppose another administrator, Charlie, is in charge of administering a subset of ten of the twenty five database servers in the Denver office (network 106), and should be granted access to the ODBC port (and nothing else) on each of those servers. If the process shown in FIG. 7 were performed with respect to Charlie, at 708 Charlie's client might receive instructions that his agent 150 should port forward 127.0.0.1-127.0.0.10 to each of those databases, respectively. Charlie's client may also be configured to use a single address but different TCP port numbers for each of the databases (e.g., 127.0.0.1:6000-127.0.0.1:6009) as applicable. Typically, database servers offer many services. By using the techniques described herein, administrators may only access those services access to which they are authorized.

At 710, a session has been established and, as described in more detail below, the gatekeeper can be configured to listen for services to be used (e.g., connection requests to be made).

Figure 8:
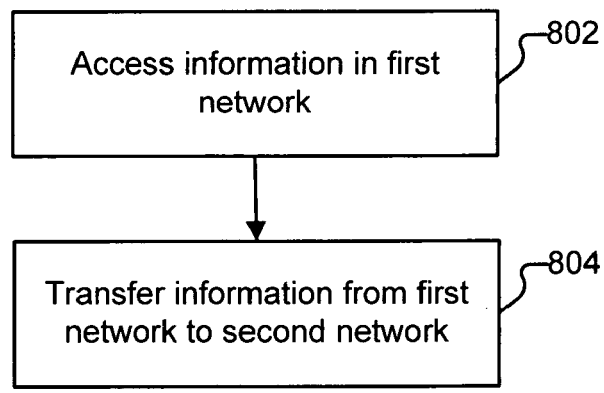
FIG. 8 is a flow chart illustrating an embodiment of a process for communicating information across a plurality of networks.

FIG. 8 is a flow chart illustrating an embodiment of a process for communicating information across a plurality of networks. The process shown in FIG. 8 can be used to perform cross network, cross platform, and/or cross protocol exchanges. In some embodiments the process shown is performed by client 102. The process begins at 802 when information is accessed at a first location. Suppose Alice wishes to copy a file from Windows server 116 in network 106 to Linux server 122 in network 108. Windows server 116 supports SMB on port 139. Linux server 122 supports SSH on port 22. At 802, Alice accesses the file by using native tools on her laptop, such as by navigating to the directory in which the file is located with the Windows file explorer. When Alice navigates to \\localhost:139, a connection is made to an SMB mount on Windows server 116.

At 804, the information is transferred from the first network to the second network. For example, at 804 Alice might open a tool such as an scp program, right click the file on Windows server 116 as shown in the file explorer window, and copy and paste it into the scp program. Agent 150 facilitates the copying of the file from Windows server 116 to Linux server 122 in a manner transparent to Alice. In various embodiments, a graphical user interface (GUI) may also be provided to client 102 which shows a list of the resources available via agent 150 and launches applications, etc. as the user interacts with the GUI.

The techniques described herein also allow administrators to run tools local to their clients against remote resources. For example, suppose Charlie (a database administrator) has a set of database diagnostic tools on his laptop that can be configured to work against a local database. By port forwarding his localhost to a remote database, Charlie is able to run his tools on the remote database. Additionally, it is possible that Charlie's database diagnostic tools may be buggy or otherwise harmful. Because he is constrained to accessing a small subset of the network, his tools are less likely to have catastrophic effects on the network at large if they behave in an undesirable manner.

Figure 9:
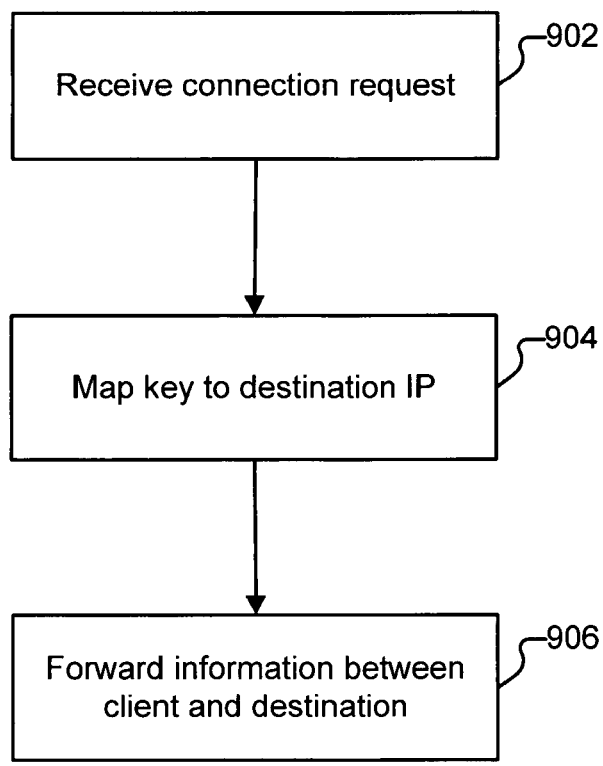
FIG. 9 is a flow chart illustrating an embodiment of a process for communicating information across a plurality of networks.

FIG. 9 is a flow chart illustrating an embodiment of a process for communicating information across a plurality of networks. In some embodiments the process shown in FIG. 9 is performed by a gatekeeper such as gatekeeper 110. The process begins at 902 when a request specific to a particular device and service is received. For example, after portion 608 of the process shown in FIG. 6 is performed, agent 150 may observe that a user is attempting to communicate with a particular localhost port. At 902, a connection request is received by gatekeeper 110 accordingly. As applicable, decryption is performed and at 904, the requested resource is mapped to the actual resource. For example, at 904 requests intended for the SSH port of Linux server 122 received by gatekeeper 112 are mapped to the IP address of Linux server 122. At 906, information destined to/from client 102 and the intended destination (e.g., Linux server 122) is bi-directionally forwarded.

Auditing Communications

Figure 10:
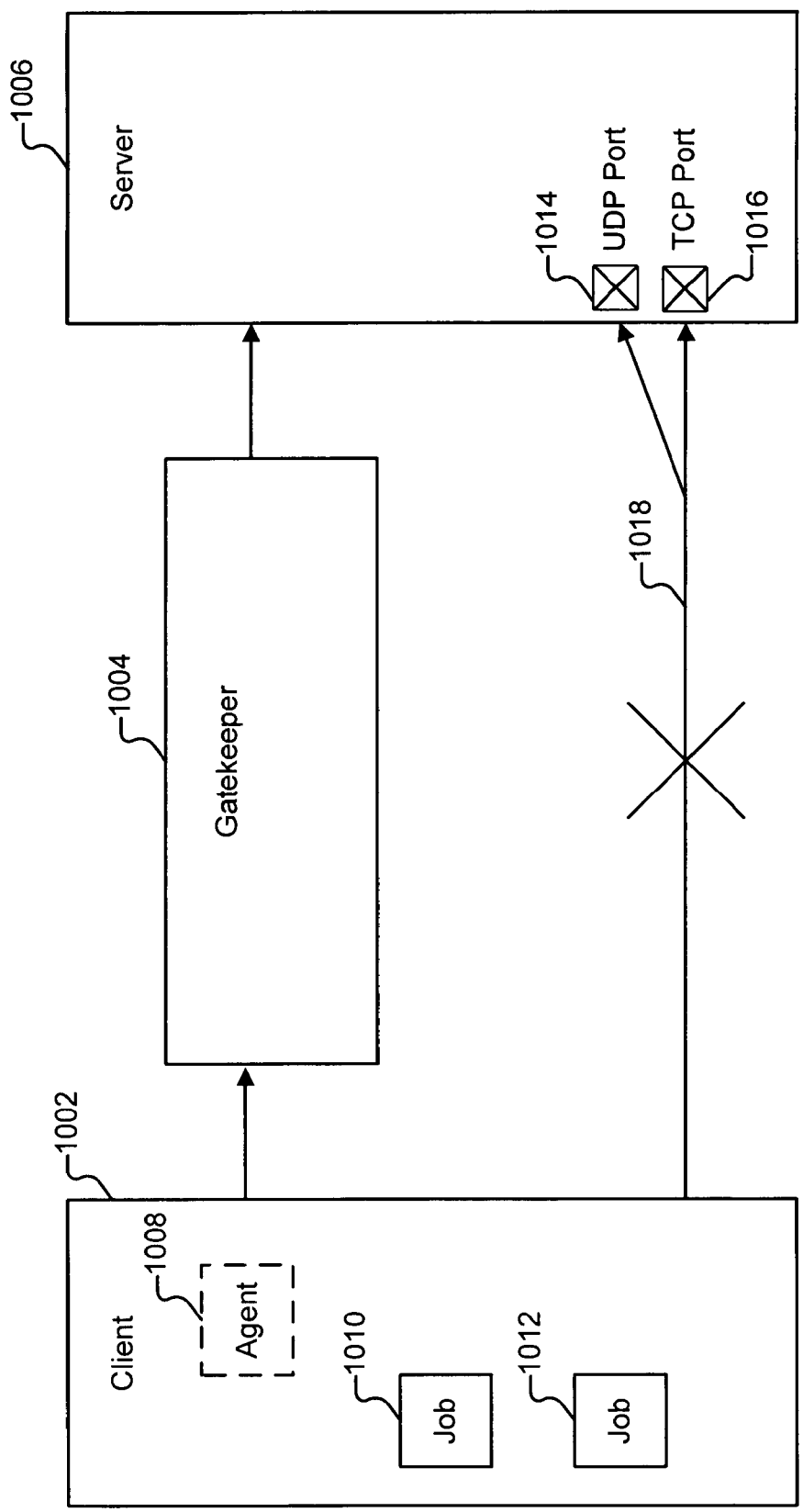
FIG. 10 is a block diagram illustrating an embodiment of an environment having communication auditing.

FIG. 10 is a block diagram illustrating an embodiment of an environment having communication auditing. In the example shown, client 1002 includes an agent 1008. An administrator would like to execute two jobs (1010 and 1012) on a periodic basis, without having to be logged into client 1002 at the time. Suppose the administrator would like job 1010 to execute at midnight and the administrator would like job 1012 to run at three in the morning and that both jobs include transmitting information to server 1006. In the example shown, server 1006 is a production server with thousands of ports. In some embodiments client 1002 and server 1006 are members of disjoint networks, such as is the case with client 102 and Windows server 116 in FIG. 1. In some embodiments client 1002 and server 1006 are on two segments of an intranet.

In a traditional environment, end users might be permitted to access server 1006 to perform assorted tasks and an administrator might be permitted to make direct connections to ports such as UDP port 1014 and TCP port 1016 (and any of the other thousands of ports on server 1006). In such a scenario client 1002 would typically be permitted to access server 1006 at all times—not just at midnight and three. In the example shown, however, direct connections from client 1002 to administrative ports 1014 and 1016 are not permitted, as indicated in FIG. 10 by line 1018 being crossed out.

Using the techniques described herein, gatekeeper 1004 is placed between client 1002 and server 1006. In some embodiments client 1002 is client 102. In some embodiments client 1002 is a server such as Linux server 122. Agent 1008 is configured to emulate the actions a user might take if the user were actively using client 1002. For example, and as described in more detail below, agent 1008 can be configured to store credentials and automatically provide them to gatekeeper 1004 upon request.

In the example shown, in order for jobs 1010 and 1012 to run successfully, client 1002 must authenticate itself to gatekeeper 1004 and gatekeeper 1004 must confirm that the resources requested by client 1002 are authorized for use by client 1002. Agent 1008 is configured to port forward localhost ports on client 1002 to gatekeeper 1004 as applicable. Jobs 1010 and 1012 are configured to make use of resources by their local address. For example, suppose job 1010 is a shell script. At the top of the file a list of variables might be provided, one of which specifies the local address and port (e.g., 127.0.0.1:25) that forwards to the desired remote resource.

If the administrator attempts to run job 1010 before midnight, gatekeeper 1004 will not forward information to server 1006. As a result, while the job may run locally, when it attempts to access port 127.0.0.1:25, the connection attempt will fail. If the administrator attempts to run job 1010 at midnight, however, connection attempts to port 127.0.0.1:25 will succeed and the job will be able to execute as planned.

Figure 11:
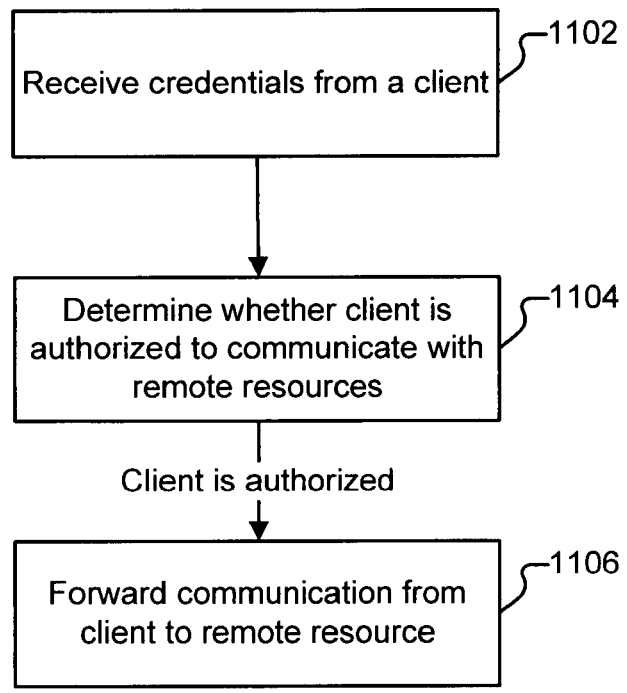
FIG. 11 is a flow chart illustrating an embodiment of a process for auditing a communication.

FIG. 11 is a flow chart illustrating an embodiment of a process for auditing a communication. In some embodiments the process shown is performed by gatekeeper 1004. The process begins at 1102 when credentials are received from a client such as client 1002. As described in more detail below, the credentials received at 1102 may be automatically supplied by an agent such as agent 1008, without the intervention of a user.

At 1104 it is determined whether the client is authorized to communicate with any remote resources. For example, at 1104 the user credentials are verified and gatekeeper 1004 determines whether the client (using the user's credentials) is authorized to access any resources and if so, whether any time constraints associated with use of those resources are satisfied.

If it is determined that the client is authorized to communicate with resources, at 1106 communications are forwarded from the client to the resource. In some embodiments communications are forwarded bidirectionally. Gatekeeper 1004 can be configured to cease performing the forwarding of 1106 for a variety of reasons. For example, authorization may be granted based on a specified session length—job 1010 may be permitted to run for a window of time of up to an hour, at which point in time access by client 1002 of server 1006 is revoked. In other embodiments, if a process is still running when the designated time limit is reached, a grace period (e.g., of an additional 30 minutes) may be provided, or additional steps may be taken such as paging the administrator responsible for the job.

Figure 12:
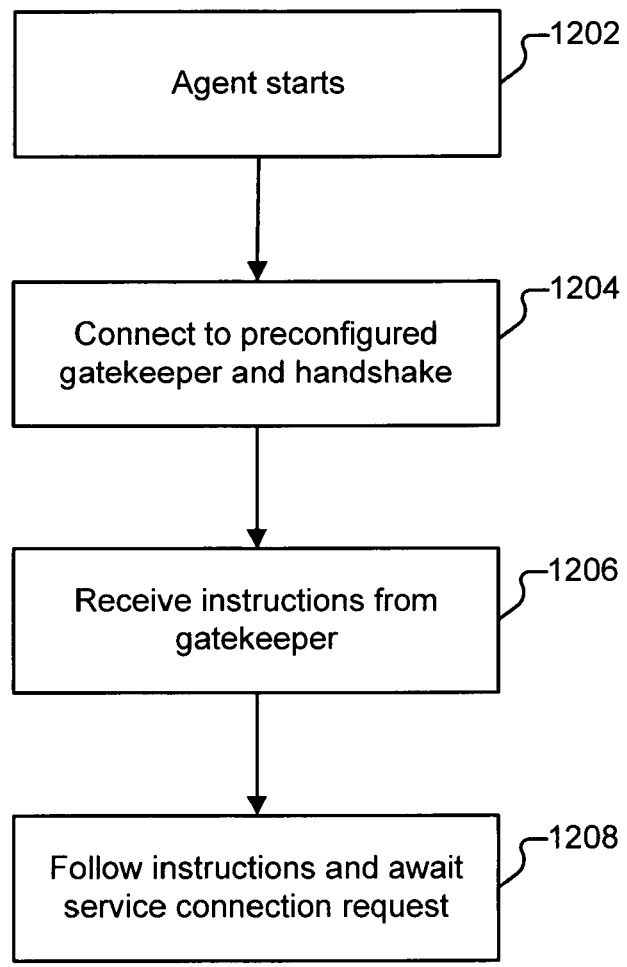
FIG. 12 is a flow chart illustrating an embodiment of a process for auditing a communication.

FIG. 12 is a flow chart illustrating an embodiment of a process for auditing a communication. In some embodiments the process shown is performed by client 1002. The process begins at 1202 when agent 1002 is started. In some embodiments agent 1202 is configured to start at startup, such as by using /etc/init.d or other startup script. In some embodiments the agent is configured to start just prior to any jobs that make use of the script. For example, if job 1010 is executed as a cron job, the cron entry may include execution of the agent as the first command, with the execution of the job listed as a second command, separated by a semicolon.

At 1204, agent 1008 connects to the first preconfigured gatekeeper (e.g., specified at 404 in the process shown in FIG. 4) and performs a handshake. In the example shown, user credentials are provided automatically. For example, during configuration of agent 1002, a user might be presented with the option of checking a box to save entered credentials and have them automatically provided when needed.

At 1206, the agent receives instructions that indicate how authorized resources can be accessed. At 1208, the agent follows the instructions received at 1206 and awaits service connection requests. For example, at 1208 the agent might bind a service to localhost port 6000.

In some embodiments a user's access to a resource may be set to always on (no time restriction). One scenario in which an always on access level might be set is if a particular job makes frequent regular use of a service (e.g., every hour). Nonetheless, it is still possible to determine which user is responsible for the recurring job, and the user is still confined to a specific port, and security benefits are realized accordingly.

Automatic Intervention

Figure 13A:
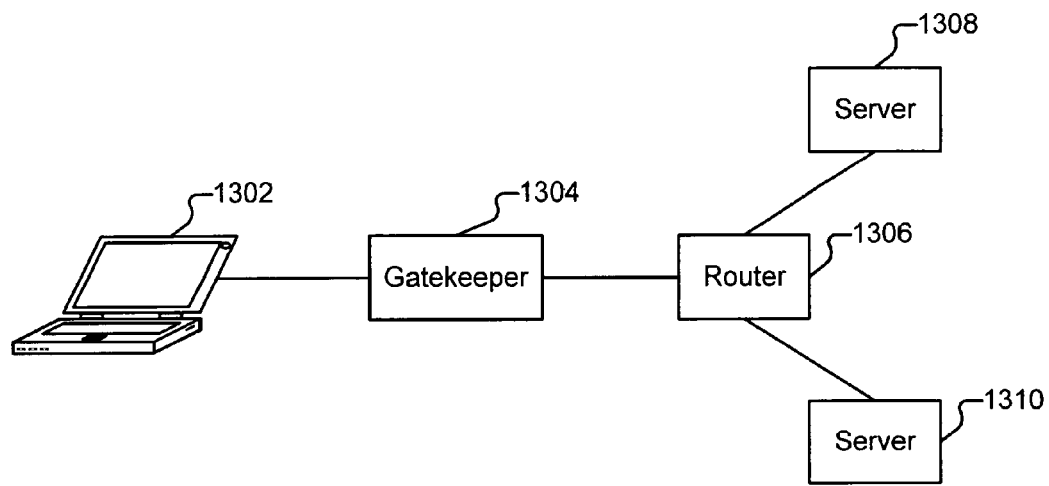
FIG. 13A is a block diagram illustrating an embodiment of an environment having network security.

FIG. 13A is a block diagram illustrating an embodiment of an environment having network security. In the example shown, client 1302 is used by an administrator to configure and maintain router 1306. Router 1306 may be one of a variety of routers. For example, router 1306 may be sophisticated and new, offering many of its own security features. Router 1306 may also be ten years old. The techniques described herein can be used to extend security features to either such router.

As described in more detail below, gatekeeper 1304 facilitates communications between client 1302 and router 1306. For example, in some embodiments gatekeeper 1304 serves a Java applet to client 1302 configured such that a user can use the Java applet to communicate with router 1306. Router 1306 is connected to additional devices such as server 1308 and server 1310. By using the techniques described herein, a user of client 1302 can be prevented from roaming from router 1306 to those devices.

Figure 13B:
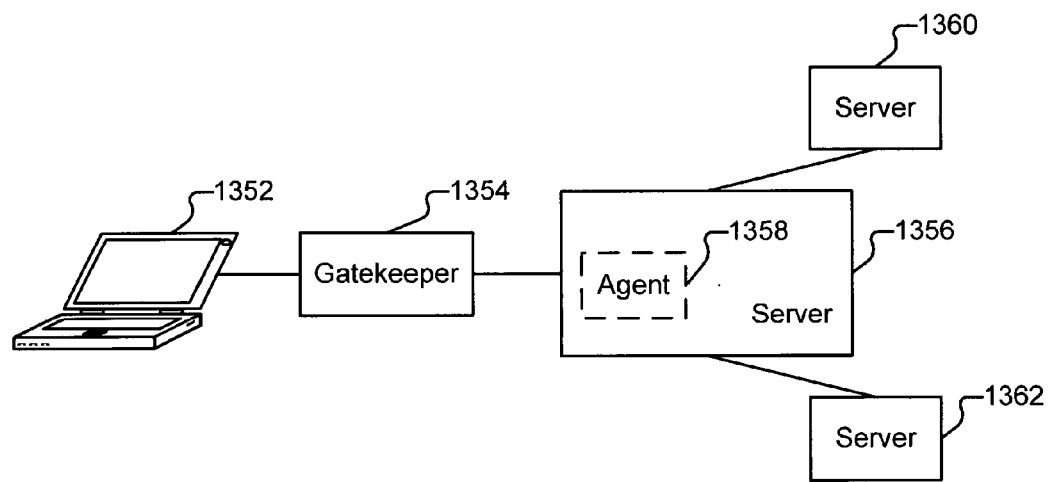
FIG. 13B is a block diagram illustrating an embodiment of an environment having network security.

FIG. 13B is a block diagram illustrating an embodiment of an environment having network security. In the example shown, client 1352 is used by an administrator to configure and maintain server 1356. Gatekeeper 1354 facilitates communications between client 1352 and server 1356. For example, in some embodiments gatekeeper 1354 serves a Java applet to client 1352 configured such that a user can use the Java applet to communicate with server 1356. As described in more detail below, in some embodiments an agent 1358 resident on server 1356 monitors for socket open attempts. Server 1356 is connected to additional devices such as servers 1360 and 1362. By using the techniques described herein, a user of client 1352 can be prevented from roaming from server 1356 to those devices.

Figure 14:
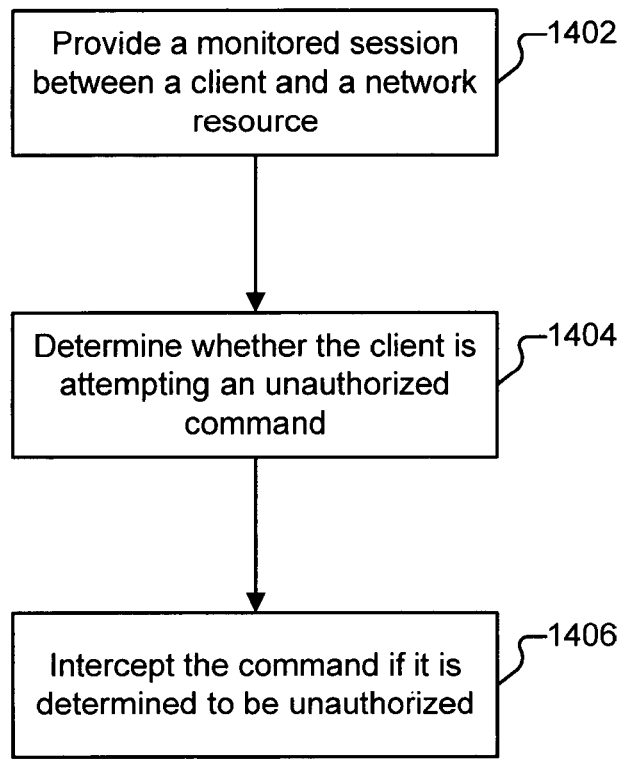
FIG. 14 is a flow chart illustrating an embodiment of a process for detecting unauthorized commands.

FIG. 14 is a flow chart illustrating an embodiment of a process for detecting unauthorized commands. In some embodiments the process shown in FIG. 14 is performed by gatekeeper 1304. The process begins at 1402 when a monitored session between a client and a network resource is provided. For example, at 1402 a client such as client 1302 requesting access to router 1306 authenticates itself to gatekeeper 1304. After verifying client 1302's credentials, gatekeeper 1304 serves a Java applet to client 1302 that allows the user of client 1302 to communicate with router 1306. In various embodiments, the applet provided by gatekeeper 1304 supports common protocols (which can be used, e.g., if client 1302 doesn't have an appropriate native client) and is preconfigured with the information needed for client 102 to communicate with router 1306. In some embodiments the applet provided is one of the applets 310 shown in FIG. 3.

Gatekeeper 1304 is able to monitor the bidirectional data stream between client 1302 and router 1306 and can capture the user's keystrokes as well as the output of the router during the session. In some embodiments the data stream is logged to a syslog server and can be subsequently used forensically and/or to diagnose historical network problems. At 1404 gatekeeper 1304 monitors for indications that a user is attempting to execute an unauthorized command. For example, at 1404 gatekeeper 1304 determines whether a user is attempting to roam from the router out to server 1308 or 1310.

A variety of techniques can be used to detect attempts at unauthorized commands. In some embodiments a blacklist is used. Routers typically have a finite set of commands that administrators may use to manipulate the router. Commands that establish outgoing connection attempts, such as SSH and telnet can be added to a blacklist of commands for which gatekeeper 1304 monitors the keystrokes sent by client 1302 to router 1306. If blacklisted commands are detected, gatekeeper 1304 can intercept the command before it is passed to router 1306 (1406).

When gatekeeper 1304 intervenes it can take a variety of actions—for example, it can drop the command or replace the command with a bogus command that is passed onto router 1306 as a typo so that the router rejects it. In some embodiments gatekeeper 1304 echoes a warning back to client 1302 that an unauthorized attempt to roam has been detected and logged and that any additional attempts will trigger a call to law enforcement, result in the locking of the user's account, etc. Irrespective of whether law enforcement will actually be contacted, such warning messages may discourage additional attempts at roaming on the part of a curious or nefarious administrator. In various embodiments, additional information such as the client's host name and local IP address are collected in the event of an unauthorized command attempt so that if the user is behind a NAT and/or shares login and password information with other contractors, the user can be more easily identified.

Gatekeeper 1304 can also take additional silent actions such as sending an email to a supervisor or triggering a pager alert, and locking a user's account after a certain number of unauthorized attempts is received.

In some embodiments a whitelist is used to detect attempts at unauthorized commands. In such a scenario, the set of commands an administrator may send from client 1302 to router 1306 is limited to a prespecified set. Any commands not on the whitelist are intercepted by gatekeeper 1304.

In various embodiments different actions are taken by gatekeeper 1304 based on which unauthorized command is detected. For example, reboot-type commands (reboot, shutdown) might trigger a warning, while roaming commands (telnet, ssh, rlogin, connect) might be dropped. Additionally, which commands appear on a blacklist or whitelist can be defined on the gatekeeper a per user basis. Thus irrespective of whether the router supports configurable logins, a user Alice can be restricted to using three commands while a user Bob can be restricted to using five commands.

Servers such as server 1356 typically support considerably more commands than a router such as router 1306. As such, using the blacklist and whitelist approaches may not be practical or effective. For example, a user might author a script on server 1356 that calls telnet, or may rely on shell features such as tab completion to provide the server with unauthorized commands without explicitly typing them. Instead of relying on white and/or blacklists, in some embodiments server 1356 is configured with an agent that monitors for socket open attempts and kills them.

Figure 15:
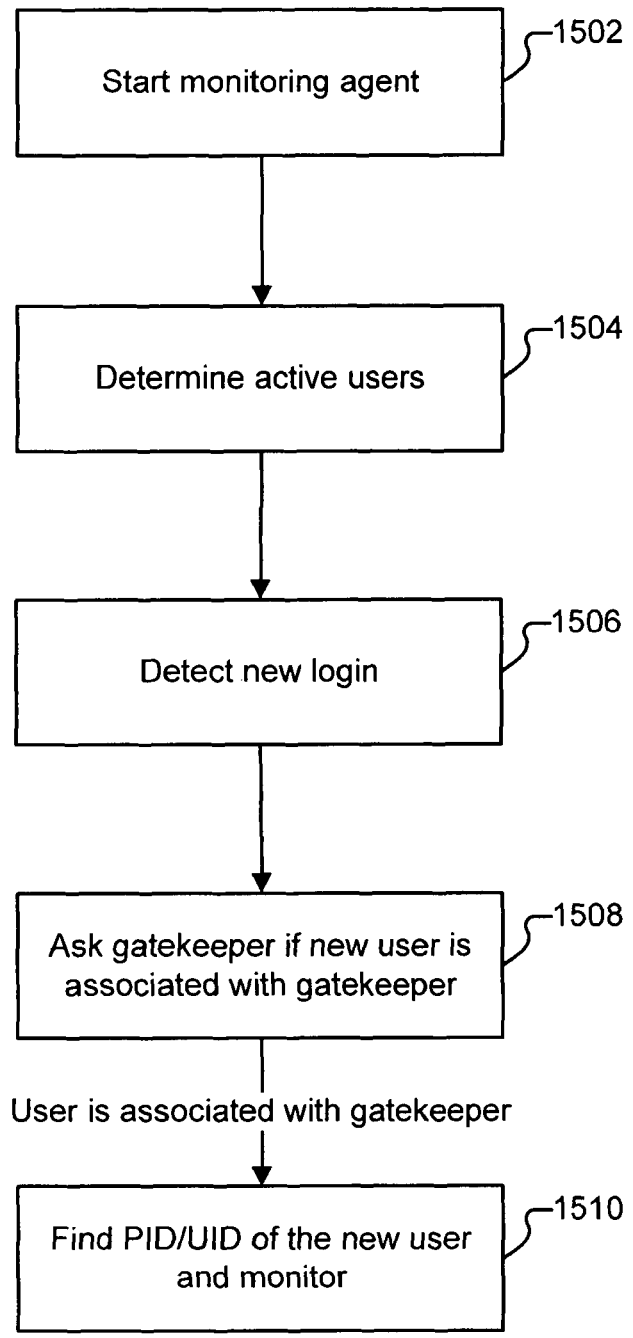
FIG. 15 is a flow chart illustrating an embodiment of a process for detecting unauthorized commands.

FIG. 15 is a flow chart illustrating an embodiment of a process for detecting unauthorized commands. In some embodiments the process shown in FIG. 15 is performed by server 1356. The process begins at 1502 when a monitoring agent such as agent 1358 is started. In some embodiments monitoring agent 1358 is started at server 1356's boot time.

At 1504, agent 1358 determines a list of active users such as root, nobody, ftp, etc. Monitoring agent 1358 continually looks for new logins to server 1356 and when one is detected (1506), at 1508 the monitoring agent asks gatekeeper 1354 whether the new server user has been provided by gatekeeper 1354. If so, at 1510 the monitoring agent obtains information such as the pid and uid of the new user. If any processes associated with the new user attempt to open sockets, monitoring agent kills them. Additional remediation, such as sending warning messages to the user or contacting a supervisor can also be performed, as applicable.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
  a set of one or more processors configured to, using a set of one or more interfaces:
    transmit a first set of credentials to a first gatekeeper of a first network;
    transmit a second set of credentials to a second gatekeeper of a second network;
    maintain a first session with the first gatekeeper;
    concurrently maintain a second session with the second gatekeeper;
    receive an indication of an attempt to transfer information from the first network to the second network; and
    in response to receiving the indication, use the concurrently maintained first and second sessions with the respective first and second gatekeepers to transfer the information from the first network to the second network; and
  a memory coupled to the set of one or more processors and configured to provide the set of one or more processors with instructions.

2. The system of claim 1 wherein the first network and second network are disjoint.

3. The system of claim 1 wherein the set of one or processors is further configured to facilitate communication with a node associated with the first gatekeeper while maintaining a session with the second gatekeeper.

4. The system of claim 1 wherein the set of one or processors is further configured to facilitate communication with a node associated with the second gatekeeper while maintaining a session with the first gatekeeper.

5. The system of claim 1 wherein the set of one or processors is further configured to facilitate communication with a first node associated with the first gatekeeper and a second node associated with the second gatekeeper at approximately the same time.

6. The system of claim 1 wherein the set of one or more processors is further configured to obtain an abstracted view of the first and second networks.

7. The system of claim 1 wherein the set of one or processors is further configured to port forward a localhost port.

8. The system of claim 1 wherein the set of one or processors is further configured to port forward a localhost port to the first gatekeeper.

9. The system of claim 1 wherein the set of one or processors is further configured to port forward a port on the first gatekeeper to a resource on the first network.

10. The system of claim 1 wherein the set of one or processors is further configured to facilitate a cross platform communication.

11. The system of claim 1 wherein the set of one or processors is further configured to facilitate making a cross protocol communication.

12. A method, including:
- transmitting, via a set of one or more interfaces, a first set of credentials to a first gatekeeper of a first network;
- transmitting a second set of credentials to a second gatekeeper of a second network;
- maintaining, using a set of one or more processors, a first session with the first gatekeeper;
- concurrently maintaining a second session with the second gatekeeper;
- receiving an indication of an attempt to transfer information from the first network to the second network; and
- in response to receiving the indication, using the concurrently maintained first and second sessions with the respective first and second gatekeepers to transfer the information from the first network to the second network.

13. The method of claim 12 wherein the first network and second network are disjoint.

14. The method of claim 12 further comprising communicating with a node associated with the first gatekeeper while maintaining a session with the second gatekeeper.

15. The method of claim 12 further comprising communicating with a node associated with the second gatekeeper while maintaining a session with the first gatekeeper.

16. The method of claim 12 further comprising communicating with a first node associated with the first gatekeeper and a second node associated with the second gatekeeper at approximately the same time.

17. The method of claim 12 further comprising obtaining an abstracted view of the first and second networks.

18. The method of claim 12 further comprising port forwarding a localhost port.

19. A computer program product, the computer program product being embodied in a non-transitory computer readable storage medium and comprising computer instructions for:
- transmitting, via a set of one or more interfaces, a first set of credentials to a first gatekeeper of a first network;
- transmitting a second set of credentials to a second gatekeeper of a second network;
- maintaining, using a set of one or more processors, a first session with the first gatekeeper; and
- concurrently maintaining a second session with the second gatekeeper;
- receiving an indication of an attempt to transfer information from the first network to the second network; and
- in response to receiving the indication, using the concurrently maintained first and second sessions with the respective first and second gatekeepers to transfer the information from the first network to the second network.

20. The computer program product of claim 19, the computer program product further comprising computer instructions for communicating with a node associated with the first gatekeeper while maintaining a session with the second gatekeeper.

* * * * *